United States Patent
Steiger et al.

(10) Patent No.: US 6,780,478 B2
(45) Date of Patent: Aug. 24, 2004

(54) RECORDING SHEETS FOR INK JET PRINTING

(75) Inventors: Rolf Steiger, Praroman (CH); Pierre-Alain Brugger, Ependes (CH)

(73) Assignee: Ilford Imaging Switzerland GmbH (CH)

( * ) Notice: Subject to any disclaimer, the term of this patent is extended or adjusted under 35 U.S.C. 154(b) by 0 days.

(21) Appl. No.: 09/867,773

(22) Filed: May 29, 2001

(65) Prior Publication Data

US 2002/0012775 A1 Jan. 31, 2002

(30) Foreign Application Priority Data

May 30, 2000 (EP) .............................................. 00810477

(51) Int. Cl.$^7$ ................................................ B41M 5/40
(52) U.S. Cl. ................................ 428/32.32; 428/32.27; 428/32.28; 428/32.29; 428/32.34; 428/32.36
(58) Field of Search ........................ 428/32.27, 32.28, 428/32.29, 32.32, 32.34, 32.36, 195, 328, 331, 213, 297.4, 500

(56) References Cited

U.S. PATENT DOCUMENTS

| | | | |
|---|---|---|---|
| 3,007,878 A | | 11/1961 | Alexander et al. |
| 4,780,356 A | * | 10/1988 | Otouma et al. ............. 428/212 |
| 5,856,001 A | * | 1/1999 | Okumura et al. ........... 428/331 |
| 6,129,785 A | * | 10/2000 | Schliesman et al. ........ 106/482 |
| 6,156,419 A | * | 12/2000 | Brugger et al. ........... 428/304.4 |
| 6,183,851 B1 | * | 2/2001 | Mishima ................... 428/304.4 |
| 6,383,611 B1 | * | 5/2002 | Kohno et al. ............... 428/195 |
| 6,485,812 B1 | * | 11/2002 | Sekiguchi ................... 428/195 |

FOREIGN PATENT DOCUMENTS

| | | |
|---|---|---|
| EP | 0298424 A2 | 1/1989 |
| EP | 0298424 A3 | 1/1989 |
| EP | 0407720 A1 | 1/1991 |
| EP | 0559324 A1 | 9/1993 |
| EP | 0622244 A1 | 11/1994 |
| EP | 777014 A2 | 4/1997 |
| EP | 777014 A3 | 4/1997 |
| EP | 875394 A1 | 11/1998 |
| EP | 967086 A1 | 12/1999 |
| JP | 60245588 | 5/1985 |
| WO | WO 00/02736 | 1/2000 |

OTHER PUBLICATIONS

G.M. Barrow, Physical Chemistry, 2nd ed, McGraw Hill Book Company, 1966, pp. 764–765.
Journal of Colloid and Interface Science, 216, pp. 429–431
d and Interface Science, 216, pp. 429–431 (1999).

* cited by examiner

*Primary Examiner*—B. Shewareged
(74) *Attorney, Agent, or Firm*—Dara L. Onofrio, Esq.; Onofrio Law

(57) ABSTRACT

A recording sheet for ink jet printing described, which consists of a support having coated onto said support at least one ink receiving layer consisting of one or more binders and a mixture of different water insoluble, inorganic oxides of the elements aluminium or silicium, oxide/hydroxides of the element aluminium or aluminium silicates, wherein at least one of said oxides, oxides/hydroxides or silicates has a pore volume of $\geq 40$ ml/100 g and is present in an amount of at least 8 weight percent relative to the total amount of all the water insoluble, inorganic oxides, oxide/hydroxides or silicates and that the primary particles of the mixture component with the largest volume have an equivalent sphere diameter of less than 20 nm and the primary particles of the mixture component with the smallest volume have an equivalent sphere diameter that is at least $\frac{1}{20}$ of the equivalent sphere diameter of the primary particles of the mixture component with the largest volume.

21 Claims, No Drawings

RECORDING SHEETS FOR INK JET PRINTING

FIELD OF THE INVENTION

The invention relates to recording sheets suitable for use in an ink jet printing process and to coating compositions for the preparation of ink receiving layers for this process. It relates especially to recording sheets where the image recorded thereon can be observed by both reflected or transmitted light and where the ink recording sheet consists of a support onto which is coated at least one ink receiving layer and where at least one of these layers contains a mixture of water insoluble, inorganic oxides or oxides/hydroxides.

BACKGROUND OF THE INVENTION

Available recording sheets for ink jet printing do not meet all the necessary requirements asked for today. In particular, there is a need to further improve their ink absorbency, ink absorption rate, image quality as well as their light stability and water fastness. A preferred embodiment of the invention relates to improved recording sheets with excellent image quality, high ink absorbency and high ink absorption rate. In particular recording sheets for ink jet printing are sought where images produced thereon show high resistance to rubbing at the surface and where the image is not altered or destroyed even under the influence of water or light.

Ink jet printing processes are of two types: continuous stream and drop-on-demand. In continuous stream ink jet printing systems, ink is emitted in a continuous stream under pressure through a nozzle. This stream disintegrates at a certain distance from the nozzle into individual droplets. The individual droplets are charged electrically according to digital data signals and deflected in a static electric field in order to direct them to a gutter for recirculation or to a specific location on the recording sheet, if this specific location on the recording sheet has to be printed.

In the non-continuous process, or the so-called "drop-on-demand" systems, a droplet is expelled from the nozzle according to digital data signals and directed to a desired location on the recording sheet. A droplet is not formed or expelled unless it is to be placed on the recording sheet.

The invention is directed towards recording sheets that may be used in both recording processes.

Recording sheets for ink jet printing must meet a number of stringent demands. The printed image has to fulfill the following properties:
  High resolution
  High color density
  Good color reproduction
  Good resistance to rubbing
  Good water fastness
  High light stability The following conditions have to be met to attain these requirements:
1. The ink needs to be absorbed quickly into the recording sheet.
2. The jetted ink droplets have to spread circularly on the recording sheet and have to form well-defined edges.
3. Dye diffusion in the recording sheet has to be low so that the diameter of the color areas is not increased more than necessary.
4. An ink droplet is not allowed to interfere with a droplet deposited earlier nor should it blur it.
5. The recording sheet needs to have a surface that gives high density and brilliance of colors.
6. The recording sheet has to show excellent physical properties before and after printing.

These requirements are partly in contradiction to each other. For example, a very rapid ink absorption rate may reduce the resistance to rubbing.

Starting with these requirements for recording sheets for ink jet printing ways are sought that should result in images showing the highest feasible color density combined with the highest feasible resistance to rubbing at the surface. Best results are obtained with recording sheets where at least one special ink receiving layer is coated onto a support.

Recording sheets for ink jet printing, where the ink receiving layer contains a water insoluble, inorganic, porous oxide in the form of colloidal aluminum oxide/hydroxide with pseudo-bohemite structure have been proposed in patent applications EP 0,298,424, EP 0,407,720, EP 0,622,244 and JP 60-245,588. Pseudo-bohemite is an agglomerate of aluminium oxide/hydroxide of formula $Al_2O_3.n\ H_2O$ where n is from 1 to 1.5.

Recording sheets for ink jet printing, where the ink receiving layer contains a water insoluble, inorganic, porous aluminum oxide/hydroxide comprising one or more elements of the periodic system of the elements with atomic numbers 57 to 71, have been proposed in patent application EP 0,875,394.

Recording sheets for ink jet printing, where the ink receiving layer contains a mixture of silicium dioxide and aluminum oxide/hydroxide (sol with 23% $Al_2O_3$), have been proposed in patent application WO 00-02,736.

Pigment layers for paper coatings containing a mixture of a coarse inorganic pigment (size 2 $\mu$m to 4 $\mu$m) and of a fine inorganic pigment, wherein the logarithmic difference of the mean particle size of both pigments is at least 0.5, have been described in patent application EP 0,777,014. Non-porous calcium carbonate or kaolin are used as pigments.

Recording sheets containing such porous oxides or oxide/hydroxides absorb aqueous inks more rapidly than recording sheets not containing such porous substances. Furthermore, such recording sheets show a tendency towards insufficient clearness and brittleness.

SUMMARY OF THE INVENTION

An objective of the invention is to provide recording sheets for ink jet printing showing high ink absorbency, high ink absorption rate and excellent image quality.

A further objective of the invention is to provide such recording sheets for ink jet printing giving excellent image quality with most ink jet printers that are available on the market today.

A further objective of the invention is to provide recording sheets for ink jet printing comprising at least one ink receiving layer containing a mixture of water insoluble, inorganic oxides of aluminium or silicium or oxide/hydroxides of aluminium, wherein at least one of these oxides or oxide/hydroxides is porous.

A further objective of the invention is a way of preparation of such ink receiving layers by using the water insoluble, inorganic oxides or oxide/hydroxides in the form of solid compounds.

This task is solved by a recording sheet for ink jet printing containing in at least one ink receiving layer in addition to one or more binders a mixture of different water insoluble, inorganic oxides of the elements aluminium or silicium or oxide/hydroxides of the element aluminium or of aluminium silicates with different chemical and/or morphological properties wherein at least one of these oxides, oxide/hydroxides or silicates is porous. The amount of this porous, water insoluble, inorganic oxide or oxide/hydroxide is at least 8 weight percent, preferentially at least 40 weight percent of the total amount of all the water insoluble, inorganic oxides, oxide/hydroxides or silicates mentioned before. The different water insoluble, inorganic oxides, oxide/hydroxides or silicates are of similar size.

γ- or δ-aluminium oxide, aluminium oxide/hydroxide, aluminium oxide/hydroxide doped with elements of the rare earth metal group of the periodic system of the elements or silicium dioxide are the preferred water insoluble, inorganic oxides or oxide/hydroxides. These substances exist in many cases in a porous and a non-porous form.

In addition, the ink receiving layers contain one or more binders.

Preferred binders are gelatin, polyvinyl alcohol, derivatives of polyvinyl alcohol, polyvinyl pyrrolidone or mixtures thereof in an amount of preferentially 5 to 50 weight percent relative to the total amount of the water insoluble, inorganic oxides, oxide/hydroxides and silicates.

Especially preferred are film forming polymers or binders in latex form.

The layers may be further modified by the addition of a cross-linking agent for the binder or binders, of fillers, of natural or synthetic polymers or other ingredients well known to someone skilled in the art that improve the pictorial and/or physical properties of the image as for example UV absorbers, optical brighteners, light stabilizers, antioxidants, humefactants, spacing agents, etc.

The invention is explained in detail in the following detailed description.

DETAILED DESCRIPTION OF THE INVENTION

We have found that the addition of mixtures of different water insoluble, inorganic oxides of the elements aluminium or silicium, of oxide/hydroxides of the element aluminium or of aluminium silicates of similar size, but with different chemical and/or morphological properties to an ink receiving layer considerably increases the ink take-up capacity for aqueous inks of such recording sheets. The partial substitution of the porous, inorganic oxide/hydroxides in the ink receiving layers of recording sheets as described in patent applications EP 0,298,424, EP 0,407,720, EP 0,622,244 and JP 60-245,588 by non-porous oxides, oxide/hydroxides or silicates leads to an increase of the ink take-up capacity and not to a decrease of the ink take-up capacity as expected. Recording sheets according to the invention also show an increased clearness and lower tendency for crack formation.

The addition of mixtures of different water insoluble, inorganic oxides of the elements aluminium or silicium, of oxide/hydroxides of the element aluminium or of aluminium silicates of similar size and different chemical and/or morphological properties leads to excellent ink receiving layers for recording sheets for ink jet printing if they are added into the layer together with one or more binders. At least one of these oxides, oxide/hydroxides or silicates needs to be porous. The amount of this porous substance is at least 8 weight percent of the total amount of all the water insoluble, inorganic oxides, oxides/hydroxides or silicates in this layer. Preferentially this layer contains these porous, water insoluble, inorganic oxides, oxide/hydroxides or silicates in an amount of at least 40 weight percent of the total amount of all the water insoluble, inorganic oxides, oxides/hydroxides or silicates in this layer.

The porosity of the water insoluble, inorganic oxides or oxide/hydroxides has been determined by measurements of the BET isotherm as described by G. M. Barrow, "Physical Chemistry", $2^{nd}$ edition, McGraw-Hill Book Company, 1966, pages 764–765. Only the addition of porous substances with a pore volume of $\geq 40$ ml/100 g to ink receiving layers of recording sheets for ink jet printing increases the absorption speed and the take-up capacity for aqueous inks. Such substances will be considered from now on as being "porous", whereas substances with a pore volume <40 ml/100 g will be considered as being "non-porous".

The size of the primary particles of these water insoluble, inorganic oxides, oxides/hydroxides or silicates, as determined by transmission electron microscopy, is in the nanometer region. The size of irregularly shaped primary particles is given by the diameter of a sphere having the same volume as the irregularly shaped primary particle (equivalent sphere diameter).

These primary particles of the component of the mixture with the largest volume have an equivalent sphere diameter of less than 20 nm. The component of the mixture having the smallest volume has an equivalent sphere diameter bigger than $\frac{1}{20}$ of the equivalent sphere diameter of the component of the mixture with the largest volume.

Mixtures are preferred wherein the primary particles of the component of the mixture with the largest volume have an equivalent sphere diameter of less than 15 nm and where the component of the mixture having the smallest volume has an equivalent sphere diameter bigger than $\frac{1}{10}$ of the equivalent sphere diameter of the component of the mixture with the largest volume.

Preferred water insoluble, inorganic oxides are γ- or δ-aluminium oxide or silicium dioxide, preferred water insoluble, inorganic oxide/hydroxides are aluminium oxide/hydroxide or aluminium oxide/hydroxide doped with elements of the rare earth metal group of the periodic system of the elements. Silicium dioxide may be positively or negatively charged. Imogolite, a naturally occurring, hydrated aluminium silicate polymer in fiber form with the composition $(OH)_3Al_2O_3SiOH$ may be used as water insoluble, inorganic aluminium silicate. Fibers of imogolite may also be prepared by synthetic methods.

Preferred water insoluble, inorganic, porous oxides with a pore volume $\geq 40$ ml/100 g are γ- or δ-aluminium oxide or silicium dioxide; preferred water insoluble, inorganic porous oxide/hydroxides with a pore volume $\geq 40$ ml/100 g are aluminium oxide/hydroxide or aluminium oxide/hydroxide doped with elements of the rare earth metal group of the periodic system of the elements.

Preferentially the aluminium oxide/hydroxide doped with elements of the rare earth metal group of the periodic system of the elements contains one or more of the elements with atomic numbers 57 to 71 in a total amount of 0.04 to 4.2 mole percent relative to $Al_2O_3$.

The following mixtures are preferred:

Aluminium oxide/hydroxide (porous) and γ- or δ-aluminium oxide (porous)

Aluminium oxide/hydroxide (porous) and silicium dioxide (porous)

γ- or δ-aluminium oxide (porous) and silicium dioxide (porous)

Aluminium oxide/hydroxide (porous) and silicium dioxide (non-porous)

γ- or δ-aluminium oxide (porous) and aluminium oxide/hydroxide (non-porous)

Aluminium oxide/hydroxide (porous) and aluminium oxide/hydroxide (non-porous)

Aluminium oxide/hydroxide (porous) and imogolite (non-porous)

γ- or δ-aluminium oxide (porous) and imogolite (non-porous)

Silicium dioxide (porous) and imogolite (non-porous)

Aluminium oxide/hydroxide doped with elements of the rare earth metal group of the periodic system of the elements or positively charged silicium oxide are preferred compounds in such mixtures.

The primary particles of the water insoluble, inorganic oxides, oxide/hydroxides or silicates may have the morphology of platelets, rods, spheres or fibers. Components showing different morphology are the preferred compounds in such mixtures. Platelets may be characterized by their aspect ratio e. g. the ratio between platelet thickness and platelet diameter.

The following combinations are preferred:

Spheres and platelets

Spheres and rods

Platelets and fibers

Spheres and fibers

An example of a spherical particle is silicium dioxide, either positively or negatively charged.

Examples of rod shaped particles are aluminium oxide/hydroxide or aluminium oxide/hydroxide doped with elements of the rare earth metal group of the periodic system of the elements.

Examples of plate like particles are aluminium oxide/hydroxide with an aspect ratio from 4 to 8 or γ- or δ-aluminium oxide with an aspect ratio from 1.5 to 3.

Imogolite is an example of a fiber shaped particle.

The binders are in most cases water-soluble polymers. Especially preferred are film forming polymers or polymers in latex form.

The water soluble polymers include for example natural polymers or modified products thereof such as albumin, gelatin, casein, starch, gum arabicum, sodium or potassium alginate, hydroxyethylcellulose, carboxymethylcellulose, α-, β- or γ-cyclodextrine and the like. In the case where one of the water soluble polymers is gelatin, all known types of gelatin may be used as for example acid pigskin or limed bone gelatin, acid or base hydrolyzed gelatin, but also derivatised gelatins like for instance phthalaoylated, acetylated or carbamoylated gelatin or gelatin derivatised with the anhydride of trimellytic acid.

A preferred natural binder is gelatin.

Synthetic binders may also be used and include for example polyvinyl alcohol; completely or partially saponified products of copolymers of vinyl acetate and other monomers; homopolymers of or copolymers with monomers of unsaturated carboxylic acids such as (meth)acrylic acid, maleic acid, crotonic acid and the like; homopolymers of or copolymers with vinyl monomers of sulfonated vinyl monomers such as vinylsulfonic acid, styrene sulfonic acid and the like. Furthermore homopolymers of or copolymers with vinyl monomers of (meth)acrylamide; homopolymers or copolymers of other monomers with ethylene oxide; polyurethanes; polyacrylamides; water soluble nylon type polymers; polyvinyl pyrrolidone; polyesters; polyvinyl lactams; acrylamide polymers; substituted polyvinyl alcohol; polyvinyl acetals; polymers of alkyl and sulfoalkyl acrylates and methacrylates; hydrolyzed polyvinyl acetates; polyamides; polyvinyl pyridines; polyacrylic acid; copolymers with maleic anhydride; polyalkylene oxides; methacrylamide copolymers and maleic acid copolymers may be used. All these polymers may also be used as mixtures.

Preferred synthetic binders are polyvinyl alcohol, derivatives of polyvinyl alcohol, polyvinyl pyrrolidone or mixtures thereof.

These polymers may be blended with water insoluble natural or synthetic high molecular weight compounds, particularly with acrylate latices or with styrene acrylate latices.

Although not specifically claimed in this invention water insoluble polymers are nevertheless considered to be part of the system.

The polymers mentioned above having groups with the possibility to react with a cross-linking agent can be cross-linked or hardened to form essentially water insoluble layers. Such cross-linking bonds may be either covalent or ionic. Cross-linking or hardening of the layers allows for the modification of the physical properties of the layers, like for instance in water take-up of the layer or in resistance against layer damage.

The cross-linking agents or hardeners are selected depending on the type of the water-soluble polymers used.

Organic cross-linking agents and hardeners include for example aldehydes (such as formaldehyde, glyoxal or glutaraldehyde), N-methylol compounds (such as dimethylol urea or methylol dimethylhydantoin), dioxanes (such as 2,3-dihydroxy dioxane), reactive vinyl compounds (such as 1,3,5-trisacrylolyl hexahy-dro-s-triazine or bis-(vinylsulfonyl)methyl ether), reactive halogen compounds (such as 2,4-dichloro-6-hydroxy-s-triazine), epoxides, aziridines, carbamoyl pyridinium compounds, melamine resins or mixtures of two or more of the above mentioned cross-linking agents.

Inorganic cross-linking agents or hardeners include for example chromium alum, aluminium alum, boric acid or borates.

The layers may also contain reactive substances that cross-link the layers under the influence of ultraviolet or infrared light, electron beams, X-rays or heat.

The recording sheets for ink jet printing according to the invention may contain in addition to the ink receiving layer supplementary layers and auxiliary layers arranged either above or below the ink receiving layer.

The layers may be modified by the addition of fillers. Possible fillers are for instance kaolin, Ca- or Ba-carbonates, silicium dioxide, titanium dioxide, bentonites, zeolites, aluminium silicate, calcium silicate or colloidal silicium dioxide. Likewise, the possibility exists to use organic inert particles such as polymer beads. These beads may consist of polyacrylates, polyacrylamides, polystyrene or different copolymers of acrylates and styrene. The fillers are selected according to the intended use of the printed images. Some of these compounds cannot be used if the printed images are to be used as transparencies. However they are of interest in cases where the printed images are be to used as remission pictures. Very often, the introduction of such fillers causes a wanted matte surface.

The recording sheets may further contain in addition to the mixture of porous inorganic compounds water-soluble metal salts, as for example salts of the alkaline earths or salts of the rare earth metal series.

The recording sheets according to our invention comprise a support with at least one ink receiving layer coated thereon. A wide variety of supports are known and commonly used in the art. They include all those supports used in the manufacture of photographic materials. This includes clear films made from cellulose esters such as cellulose triacetate, cellulose acetate, cellulose propionate or cellulose acetatelbutyrate, polyesters such as polyethylene terephthalate, polyamides, polycarbonates, polyimides, polyolefins, polyvinyl acetals, polyethers, polyvinyl chloride and polysulfonamides. Polyester film supports, and especially polyethylene terephthalate are preferred because of their excellent dimensional stability characteristics. The usual supports used in the manufacture of opaque photographic materials may be used including for example baryta paper, polyethylene coated papers, voided polyester as for instance manufactured by DuPont under the trade name of Melinex®. Especially preferred are resin-coated paper or voided polyester.

When such support materials, in particular polyester, are used, a subbing layer is advantageously coated first to improve the bonding of the ink receiving layers or other layers to the support. Useful subbing compositions for this purpose are well known in the photographic industry and include for example terpolymers of vinylidene chloride, acrylonitrile and acrylic acid or of vinylidene chloride, methyl acrylate and itaconic acid.

Also used as supports are plain paper, comprising all different types of papers varying widely in their composition and in their properties. Pigmented papers and cast coated papers can be used as well as metal foils, such as foils made from aluminium.

The ink receiving layers according to this invention are in general coated from aqueous solutions or dispersions containing all necessary ingredients. In many cases, surfactants are added to those coating solutions in order to improve the coating behavior and the evenness of the layers. Besides being necessary for coating purposes, these compounds may have an influence on the image quality and may therefore be selected with this specific goal in mind. Although not specifically claimed in this invention surfactants nevertheless form an important part of the invention.

In addition to the above mentioned compounds recording sheets according to our invention may contain additional additives aimed at further improving its performance, as for example brightening agents to improve the whiteness, such as stilbenes, coumarines, triazines, oxazoles or others compounds known to someone skilled in the art.

Light stability can be improved by adding UV absorbers such as benzotriazoles, benzophenones, thiazolidones, oxazoles, thiazoles and other compounds known to someone skilled in the art. The amount of UV absorber may vary from 200–2000 mg/m$^2$, preferably from 400–1000 mg/m$^2$. The UV absorbers may be added to any of the layers of the recording sheets according to the invention. It is preferred however, if they are added, the UV absorbers are included in the top-most layer of the system.

It is further known that images produced by ink jet printing may be protected from degradation by the addition of stabilizers and antioxidants. Examples of such compounds are sterically hindered phenols, sterically hindered amines, chromanols, reducing agents such as ascorbic acid and the like. The above-mentioned additives may be added as aqueous solutions to the coating solutions. In the case where these compounds are not sufficiently water-soluble, they may be incorporated into the coating solutions by other common techniques known in the art. The compounds may be for example dissolved in a water miscible solvent such as lower alcohols, glycols, ketones, esters or amides. Alternatively, the compounds may be added to the coating solutions as fine dispersions, as oil emulsions, as cyclodextrine inclusion compounds or incorporated into latex particles.

Typically, the receiving layers according to this invention have a thickness in the range of 0.5 µm to 100 µm dry thickness, preferably in the range of 5 µm to 50 µm dry thickness.

The coating solutions may be coated onto the support by any number of suitable procedures. Usual coating methods include for example extrusion coating, air knife coating, doctor blade coating, cascade coating or curtain coating. The coating solutions may also be applied using spray techniques. The ink receiving layers can be built up from several single layers that can be coated one after the other or simultaneously. It is likewise possible to coat a support on both sides with ink receiving layers. It is also possible to coat an antistatic layer or an anticurl layer on the backside. The selected coating method however is not to be considered limiting for the present invention.

Inks for ink jet printing consist in essence of a liquid vehicle and a dye or pigment dissolved or suspended therein. The liquid vehicle for ink jet inks consists in general of water or a mixture of water and a water miscible organic solvent such as ethylene glycol, higher molecular weight glycols, glycerol, dipropylene glycol, polyethylene glycol, amides, polyvinyl pyrrolidone, N-methylpyrrolidone, cyclohexylpyrrolidone, carboxylic acids and their esters, ethers, alcohols, organic sulfoxides, sulfolane, dimethylformamide, dimethylsulfoxide, cellosolve, polyurethanes, acrylates and the like.

The non-water parts of the ink generally serve as humefactants, cosolvents, viscosity regulating agents, ink penetration additives, leveling agents or drying agents. The organic components have in most cases a boiling point, which is higher than that of water. In addition, aqueous inks used for printers of the continuous flow type may contain inorganic or organic salts to increase conductivity. Examples of such salts include nitrates, chlorides, phosphates and salts of water-soluble organic acids such as acetates, oxalates and citrates. The dyes and pigments suitable for the preparation of inks useable with the recording sheets according to the invention cover practically all classes of known coloring compounds. Dyes or pigments typically used for this purpose are described in patent application EP 0,559,324. The recording sheets according to this invention are meant to be used in conjunction with most of the inks representing the state of the art.

Other additives present in inks are for instance surfactants, optical brighteners, UV absorbers, light stabilizers, biocides and polymeric additives.

This description of inks is for illustration only and is not to be considered as limiting for the purpose of the invention.

The following methods have been used for testing and comparison of the recording sheets described herein:

Image Homogeneity

Recording sheets according to the invention, as described later on in the examples, were printed with an ink jet printer EPSON STYLUS™ COLOR 500 in transparent mode using original inks. Color patches with 11 fields were printed in each of the 7 colors cyan, magenta, yellow, black, red, green and blue, wherein the number of droplets decreases linearly from field 1 (100%) to field 10 (10%).

Field 11 has a 5% droplet number. After printing, the number of inhomogeneous fields was counted on a light box. Big numbers indicate bad image quality (high number of inhomogeneous fields). Zero indicates perfect image quality, as none of the fields is inhomogeneous.

Dye Bleeding

Recording sheets according to the invention were printed with an ink jet printer EPSON STYLUS™ COLOR 500 in transparent mode using original inks. Color patches in intimate contact with 100% droplet numbers were printed. Dye bleeding was judged on the boundaries blue-yellow; green-magenta and red-cyan and rated on a scale from 1 (extremely high dye bleeding) to 5 (no dye bleeding).

The substances listed and characterized (chemical and morphological properties) in Table 1 were used in the examples.

Pore volumes were determined by the method described by G. M. Barrow, "Physical Chemistry", 2nd edition, McGraw-Hill Book Company, 1966, pages 764–765.

Size and shape of the primary particles were determined by transmission electron microscopy.

Polyvinyl alcohol of hydrolysis degree 98%–99% and of molecular weight 85'000 to 146'000, available from ALDRICH Chemie, Buchs, Switzerland, was used as binder.

The coated examples were prepared by coating 100 g/m² of the coating solutions described later on onto a transparent polyester support and drying the coated support afterwards for 60 minutes at a temperature of 35° C.

dispersed by exposure to ultrasound at a temperature of 25° C. in 162.73 g of aqueous acetic acid (2%).

b) Preparation of Aluminium Oxide/hydroxide by Hydrolysis of Aluminium Isoproioxide (Compound of Example 1a) of EP 0,967,086 (ICH 286)

A mixture of 360 g of deionised water and 338 g of isopropanol was prepared in a glass vessel. 153 g of aluminium isopropoxide (available from Fluka Chemie AG, Buchs, Switzerland) were added to this mixture at a temperature of 75° C. and the resulting mixture was stirred for 4 hours at a temperature between 75° C. and 78° C.. Afterwards the temperature was increased to 95° C. and 1.5 g of 2-hydroxypropionic acid were added. The temperature was then reduced to between 75° C. and 78° C. and the mixture was kept under stirring for 48 hours at this temperature. Finally, the resulting colloidal solution was evaporated under vacuum. 43 g of a white solid with 75.2% of $Al_2O_3$ were obtained. The X-ray diffraction spectrum was equivalent to the one of pseudo-bohemite of formula AlOOH.

TABLE 1

| Compound | Composition | Morphology of Primary Particles | Size of Primary Particles | Pore Volume (ml/100 g) | Equivalent Sphere Diameter |
|---|---|---|---|---|---|
| aluminium oxide C | γ-and δ-$Al_2O_3$ | polygonal platelets (aspect Ratio 1.5 to 3) | mean equivalent diameter 12 nm; thickness 4 to 8 nm | 84 | 10.9 nm |
| ICH 286 (Example 1a) from EP 0,967,086) | aluminium oxide/ hydroxide | Rods | 1.0 × 8 nm | 48 | 2.58 nm |
| Disperal ® 100/2 | aluminium oxide/ hydroxide | Rods | 0.5 × 8 nm | 52 | 1.6 nm |
| Dispal ® 14N25 | aluminium oxide/ hydroxide | hexagonal platelets with well-defined edges (aspect ratio 4 to 8) | mean equivalent diameter 30 nm; thickness 3.5 to 7.5 nm | 26 | 18.9 nm |
| $SiO_2$ (pos) | positively charged $SiO_2$ | Spheres | mean diameter 7 to 12 nm | 108 | 9.5 nm |
| Imogolite | $(OH)_3Al_2O_3SiOH$ | nano-crystalline hollow fibers | mean external diameter 2 nm, length ca. 500 nm | <20 | 14.4 nm |
| ICH 277 (Example 1a) from EP 0,875,394) | aluminium oxide/ hydroxide (La-doped) | Rods | 1.0 × 9 nm | 50 | 2.6 nm |
| Snowtex ® Up | negatively charged $SiO_2$ | Spheres | 10 nm | 27 | 10.0 nm |

EXAMPLES

Example 1 a) Preparation of an Aqueous Dispersion of Aluminium Oxide C with 18 Weight Percent of $Al_2O_3$ 37.27 g of aluminium oxide C (available from DEGUSSA AG, Frankfurt/Main, Germany) with 96.6% of $Al_2O_3$ were c) Preparation of the Coating Solution 38.89 g of the aqueous dispersion of $Al_2O_3$ of example 1a) were mixed with 3.99 g of ICH 286 and 16 g of a solution of polyvinyl alcohol (7.5%) at a temperature of 40° C. by exposure to ultrasound. The total weight was adjusted to 100 g with deionised water.

The coating solution contains aluminium oxide C and ICH 286 in a weight ratio of 70:30, based on the $Al_2O_3$ content of both compounds.

d) Coating

1 $m^2$ of the coated support contains 10 g of inorganic oxides, calculated as $Al_2O_3$, and 1.2 g of polyvinyl alcohol.

Comparative Example 1 C1

55.56 g of the aqueous dispersion of $Al_2O_3$ of example 1a) were used in the coating solution of example 1c) instead of the mixture of aluminium oxide C and ICH 286. 1 $m^2$ of the coated support contains 10 g of inorganic oxides, calculated as $Al_2O_3$, and 1.2 g of polyvinyl alcohol.

Comparative Example 1 C2

13.3 g of ICH 286 were used in the coating solution of example 1c) instead of the mixture of aluminium oxide C and ICH 286. 1 $m^2$ of the coated support contains 10 g of inorganic oxides, calculated as $Al_2O_3$, and 1.2 g of polyvinyl alcohol.

Examples 2–5

In these examples the compounds aluminium oxide C and ICH 286 of example 1 were used in the proportion of ingredients indicated in Table 2.

TABLE 2

| Example | Proportion of Ingredients | |
|---|---|---|
| | aluminium oxide C | ICH 286 |
| 2 | 60 | 40 |
| 3 | 50 | 50 |
| 4 | 40 | 60 |
| 5 | 30 | 70 |

Example 6 c). Preparation of the Coating Solution 13.3 g of the aqueous dispersion of $Al_2O_3$ of example 1a) were dispersed together with 5.6 g of Disperal® 100/2 (available from CONDEA GmbH, Hamburg, Germany), 0.96 g of acetic acid and 9.6 g of a solution of polyvinyl alcohol (10%) at a temperature of 40° C. by exposure to ultrasound. The total weight was adjusted to 80 g with deionised water.

The coating solution contains aluminium oxide C and Disperal® 100/2 in a weight ratio of 70:30, based on the $Al_2O_3$ content of both compounds.

d) Coating

1 $m^2$ of the coated support contains 8.5 g of inorganic oxides, calculated as $Al_2O_3$, and 1.2 g of polyvinyl alcohol.

Comparative Example 6 C1 c) Preparation of the Coating Solution 5.6 g of Disperal® 100/2 were dispersed in 0.96 g of acetic acid and 56 g of deionised water by exposure to ultrasound at a temperature of 20° C. Afterwards 9.6 g of a solution of polyvinyl alcohol (10%) were added and the total weight was adjusted to 80 g with deionised water. The solution was exposed to ultrasound for 3 more minutes.

d) Coating

1 $m^2$ of the coated support contains 8.5 g of inorganic oxides, calculated as $Al_2O_3$, and 1.2 g of polyvinyl alcohol.

Comparative Example 6 C2 c) Preparation of the Coating Solution 37.8 g of the aqueous dispersion of $Al_2O_3$ of example 1a) were dispersed together with 9.6 g of a solution of polyvinyl alcohol (10%) by exposure to ultrasound. The total weight was adjusted to 80 g with deionised water.

d) Coating

1 $m^2$ of the coated support contains 8.5 g of inorganic oxides, calculated as $Al_2O_3$, and 1.2 g of polyvinyl alcohol.

Example 7 c) Preparation of the Coating Solution 10.0 g of 10.0 g Dispal® 14R25 (a 24.2% aqueous dispersion of aluminium oxide/hydroxide, available from Condea Vista, Houston, USA) were dispersed with 5.6 g of Disperal® 100/2, 0.96 g of acetic acid and 45 g of deionised water by exposure to ultrasound. Afterwards 9.6 g of a solution of polyvinyl alcohol (10%) were added and the total weight was adjusted to 80 g with deionised water. The solution was exposed to ultrasound for 3 more minutes. The coating solution contains Dispal® 14R25 and Dispera® 100/2 in a weight ratio of 36:64, based on the $Al_2O_3$ content of both compounds.

d) Coating

1 $m^2$ of the coated support contains 10 g of inorganic oxides, calculated as $Al_2O_3$, and 1.2 g of polyvinyl alcohol.

Comparative Example 7 C1 c) Preparation of the Coating Solution 33.3 g of Dispal® 14R25 were dispersed at a temperature of 20° C. in 0.96 g of acetic acid and 45 g of deionised water by exposure to ultrasound. Afterwards 9.6 g of a solution of polyvinyl alcohol (10%) were added and the total weight was adjusted to 80 g with deionised water. The solution was exposed to ultrasound for 3 more minutes. d) Coating 1 $m^2$ of the coated support contains 10 g of inorganic oxides, calculated as $Al_2O_3$, and 1.2 g of polyvinyl alcohol.

Example 8 a) Preparation of an Aqueous Dispersion of Positively Charged $SiO_2$ (12 Weight Percent $SiO_2$ (pos))

This dispersion was prepared by the method described in patent U.S. Pat. No. 3,007,878:

1.97 g of aluminium chlorohydrate of formula $Al_2(OH)_5Cl.2.5\ H_2O$ (Locron, available from Clariant AG, Muttenz, Switzerland) were dissolved in 85 g of deionised water at a temperature of 20° C. under stirring. Afterwards the solution was heated to a temperature of 40° C., 12 g of Aerosil 200 ($SiO_2$ with an isoelectric point at pH 2.0, available from Degussa AG, Frankfurt/Main, Germany) were added, and the mixture was dispersed by exposure to ultrasound and filtered. The resulting solution contains 12 weight percent of positively charged $SiO_2$ with an isoelectric point at pH 9.1 (determined by acustophoretic measurement).

c) Preparation of the Coating Solution 14.41 g of the aqueous dispersion of positively charged $SiO_2$ of example 8a) were dispersed at a temperature of 20° C. together with 9.61 g of the aqueous dispersion of $Al_2O_3$ of example 1a) and 7.14 g of Dispal® 14R25 (24% aqueous dispersion) under stirring. Afterwards the solution was heated to a temperature of 40° C., 12.1 g of ICH 286 and 20.8 g of a solution of polyvinyl alcohol (7.5%) were added, the total weight was adjusted to 100 g with deionised water and the solution was homogenized by exposure to ultrasound. The coating solution contains the compounds aluminium oxide C, Dispera® 100/2, ICH 286 and positively charged silicium dioxide in a weight ratio of 10:10:70:10.

d) Coating 1 m² of the coated support contains 17.3 g of inorganic compounds and 1.56 g of polyvinyl alcohol.

Comparative Example 8 C1 c) Preparation of the Coating Solution 17.3 g of ICH 286 were dispersed at a temperature of 40° C. in 6.8 g of acetic acid and 40 g of deionised water by exposure to ultrasound. Afterwards 20.8 g of a solution of polyvinyl alcohol (7.5%) were added and the total weight was adjusted to 100 g with deionised water.

d) Coating 1 m² of the coated support contains 17.3 g of inorganic compounds and 1.56 g of polyvinyl alcohol.

Examples 9–12

In the coating solutions the compounds aluminium oxide C, Dispal® 14R25, ICH 286 and positively charged silicium dioxide of example 8 were used in the proportions of ingredients indicated in Table 3.

TABLE 3

| | Proportion of Ingredients | | | |
|---|---|---|---|---|
| Example | Aluminium oxide C | Dispal ® 14R25 | ICH 286 | SiO$_2$ (pos) |
| 9 | | | 80 | 20 |
| 10 | | | 90 | 10 |
| 11 | 10 | | 80 | 10 |
| 12 | | 10 | 80 | 10 |

Example 13 a) Preparation of a Colloidal Aqueous Dispersion of Imogolite (0.6 Weight Percent)

This dispersion was prepared by the method described in "Journal of Colloid and Interface Science" 216, 429–431 (1999).

c) Preparation of the Coating Solution 50 g of the aqueous dispersion of imogolite of example 13a) were dispersed under stirring at a temperature of 20° C. in 1.2 g of acetic acid and 2.8 g of deionised water. Afterwards the solution was heated to a temperature of 40° C., 17.2 g of ICH 286 and 20.8 g of a solution of polyvinyl alcohol (7.5%) were added, the total weight was adjusted to 100 g with deionised water and the solution was homogenized by exposure to ultrasound.

The coating solution contains the compounds ICH 286 and imogolite in a weight ratio of 97.7:2.3.

d) Coating 1 m² of the coated support contains 17.3 g of inorganic compounds and 1.56 g of polyvinyl alcohol.

Example 14 c) Preparation of the Coating Solution 50 g of the aqueous dispersion of imogolite of example 13a) were dispersed under stirring at a temperature of 20° C. in 7.87 g of acetic acid and 0.9 g of deionised water. Afterwards the solution was heated to a temperature of 40° C., 12.94 g of aluminium oxide C and 20.8 g of a solution of polyvinyl alcohol (7.5%) were added, the total weight was adjusted to 100 g with deionised water and the solution was homogenized by exposure to ultrasound. The coating solution contains aluminium oxide C and imogolite in a weight ratio of 97.7:2.3.

d) Coating 1 m² of the coated support contains 13.24 g of inorganic compounds and 1.50 g of polyvinyl alcohol.

Comparative Example 14 C1 c) Preparation of the Coating Solution 12.94 g of aluminium oxide C were dispersed at a temperature of 40° C. in 7.87 g of acetic acid (17.65%) and 50.9 g of deionised water by exposure to ultrasound. Afterwards 20.0 g of a solution of polyvinyl alcohol (7.5%) were added, the total weight was adjusted to 100 g and the solution was homogenized by exposure to ultrasound.

d) Coating 1 m² of the coated support contains 12.94 g of inorganic compounds and 1.50 g of polyvinyl alcohol.

Example 15 b) Preparation of Aluminium Oxide/hydroxide Doped with La (2.2 mole Percent Relative to Al$_2$O$_3$) (Compound of Example 1a) of EP 0,875,394 (ICH 277)) 50 g of aluminium oxide/hydroxide Disperal® 100/2 were dispersed at a temperature of 20° C. for 15 minutes under vigorous mechanical stirring in 948 g of doubly distilled water. Afterwards temperature was increased to 90° C. and stirring was continued for 15 minutes at this temperature. 2.04 g of LaCl$_3$ (available from Fluka Chemie AG, Buchs, Switzerland) were added as a solid and stirring was continued for 120 minutes. The solid was filtered, washed three times with doubly distilled water and dried at 110° C.

c) Preparation of the Coating Solution 44.41 g of the aqueous dispersion of Al$_2$O$_3$ of example 1a) were mixed with 2.66 g of ICH 277 and 16 g of a solution of polyvinyl alcohol (7.5%) at a temperature of 40° C. by exposure to ultrasound. The total weight was adjusted to 100 g with deionised water.

The coating solution contains aluminium oxide C and ICH 277 (aluminium oxide/hydroxide doped with La) in a weight ratio of 80:20, based on the Al$_2$O$_3$ content of both compounds.

d) Coating 1 m² of the coated support contains 10 g of inorganic oxides, calculated as Al$_2$O$_3$, and 1.2 g of polyvinyl alcohol.

Comparative Example 15 C1

13.3 g of ICH 277 (aluminium oxide/hydroxide doped with La) were used in the coating solution of comparative example 8 C1 instead of 13.3 g of ICH 286. 1 m² of the coated support contains 10 g of inorganic oxides, calculated as Al$_2$O$_3$, and 1.2 g of polyvinyl alcohol.

Example 16 a) Preparation of an Aqueous Dispersion of Positively Charged SiO$_2$ (24 Weight Percent SiO$_2$ (pos))

24 g of Aerosit 200 were dissolved under stirring at a temperature of 20° C. in 72 g of aqueous acetic (2.78%) acid. Afterwards 3.94 g of aluminium chlorohydrate of formula Al$_2$(OH)$_5$Cl.2.5 H$_2$O were added and the total weight was adjusted to 100 g. The resulting solution contains 24 weight percent of positively charged SiO$_2$.

c) Preparation of the Coating Solution 45.83 g of the aqueous dispersion of imogolite of example 13a) were mixed under stirring at a temperature of 40° C. with 27.08 g of the aqueous dispersion of positively charged SiO$_2$ of example 16a). Afterwards 23.4 g of a solution of polyvinyl alcohol (7.5%) were added, the total weight was adjusted to 100 g with deionised water and the solution was homogenized by exposure to ultrasound.

The coating solution contains positively charged of positively charged SiO$_2$ and imogolite in a weight ratio of 96:4.

d) Coating 1 m² of the coated support contains 6.5 g of positively charged SiO$_2$ and imogolite and 1.75 g of polyvinyl alcohol.

Comparative Example 16 C1
c) Preparation of the Coating Solution 27.08 g of the aqueous dispersion of positively charged $SiO_2$ of example 16a) were mixed at a temperature of 40° C. with 23.4 g of a solution of polyvinyl alcohol (7.5%). The total weight of the solution was adjusted to 100 g deionised water and the solution was homogenized by exposure to ultrasound.

d) Coating

1 $m^2$ of the coated support contains 6.5 g of positively charged $SiO_2$ and 1.75 g of polyvinyl alcohol.

Example 17
c) Preparation of the Coating Solution 8.87 g of the aqueous dispersion of $Al_2O_3$ of example 1a) were mixed with 26.45 g of Dispal® 14R25, 9.6 g of a solution of polyvinyl alcohol (10%) were added at a temperature of 40° C., the total weight of the mixture was adjusted to 100 g with deionised water and the mixture was homogenized by exposure to ultrasound.

The coating solution contains aluminium oxide C and Dispal® 14R25 in a weight ratio of 70:30, based on the $Al_2O_3$ content of both compounds.

d) Coating

1 $m^2$ of the coated support contains 10 g of inorganic oxides, calculated as $Al_2O_3$, and 1.2 g of polyvinyl alcohol.

Example 18
c) Preparation of the Coating Solution 14.41 g of the aqueous dispersion of positively charged $SiO_2$ of example 8a) were mixed with 64.26 g of Dispal® 14R25 under stirring at a temperature of 20° C. Afterwards 20.8 g of a solution of polyvinyl alcohol (7.5%) were added, the total weight was adjusted to 100 g with deionised water and the solution was homogenized by exposure to ultrasound.

The coating solution contains the compounds Dispal® 14R25 and positively charged silicium dioxide in a weight ratio of 90:10.

d) Coating

1 $m^2$ of the coated support contains 17.3 g of inorganic compounds and 1.56 g of polyvinyl alcohol.

Comparative Example 18 C1
c) Preparation of the coating solution 71.5 g of Dispal® 14R25 were dispersed at a temperature of 20° C. in 2.14 g of acetic acid and 5.56 g of deionised water by exposure to ultrasound. Afterwards 20.8 g of a solution of polyvinyl alcohol (7.5%) were added, the total weight was adjusted to 100 g with deionised water and the solution was homogenized for 3 minutes by exposure to ultrasound.

d) Coating

1 $m^2$ of the coated support contains 17.3 g of inorganic compounds and 1.56 g of polyvinyl alcohol.

Example 19
c) Preparation of the Coating Solution 48.75 g of the aqueous dispersion of positively charged $SiO_2$ of example 8a) were mixed at a temperature of 20° C. with 2.6 g of Dispal® 14R25 and 11.16 g of deionised water under stirring. Afterwards the solution was heated to a temperature of 40° C., 23.4 g of a solution of polyvinyl alcohol (7.5%) were added, the total weight was adjusted to 100 g with deionised water and the solution was homogenized by exposure to ultrasound. The coating solution contains the compounds Dispal® 14R25 and positively charged silicium dioxide in a weight ratio of 10:90.

d) Coating

1 $m^2$ of the coated support contains 6.5 g of inorganic compounds and 1.75 g of polyvinyl alcohol.

Comparative Example 19 C1
c) Preparation of the Coating Solution 54.17 g of the aqueous dispersion of positively charged $SiO_2$ of example 8a) were mixed at a temperature of 20° C. with 19.43 g of deionised water under stirring. Afterwards the solution was heated to a temperature of 40° C., 23.4 g of a solution of polyvinyl alcohol (7.5%) were added, the total weight was adjusted to 100 g with deionised water and the solution was homogenized by exposure to ultrasound.

d) Coating

1 $m^2$ of the coated support contains 6.5 g of inorganic compounds and 1.75 g of polyvinyl alcohol.

Example 20
c) Preparation of the coating solution 43.33 g of the aqueous dispersion of positively charged $SiO_2$ of example 8a) were mixed at a temperature of 20° C. with 7.23 g of the aqueous dispersion of $Al_2O_3$ of example 1a) and 11.16 g of deionised water under stirring. Afterwards the solution was heated to a temperature of temperature of 40° C., 23.4 g of a solution of polyvinyl alcohol (7.5%) were added, the total weight was adjusted to 100 g with deionised water and the solution was homogenized by exposure to ultrasound. The coating solution contains the compounds aluminium oxide C and positively charged silicium dioxide in a weight ratio of 20:80.

d) Coating

1 $m^2$ of the coated support contains 6.5 g of inorganic compounds and 1.75 g of polyvinyl alcohol.

Comparative Example 20 C1
c) Preparation of the Coating Solution 54.17 g of the aqueous dispersion of positively charged $SiO_2$ of example 8a) were mixed at a temperature of 20° C. with 23.4 g of a solution of polyvinyl alcohol (7.5%). Afterwards the total weight was adjusted to 100 g with deionised water and the solution was homogenized by exposure to ultrasound.

d) Coating

1 $m^2$ of the coated support contains 6.5 g of positively charged $SiO_2$ and 1.75 g of polyvinyl alcohol.

Example 21
c) Preparation of the Coating Solution 10.83 g of the aqueous dispersion of positively charged $SiO_2$ of example 8a) were mixed at a temperature of 20° C. with 28.92 g of the aqueous dispersion of $Al_2O_3$ of example 1a) and 11.16 g of deionised water under stirring. Afterwards the solution was heated to a temperature of 40° C., 23.4 g of a solution of polyvinyl alcohol (7.5%) were added, the total weight was adjusted to 100 g with deionised water and the solution was homogenized by exposure to ultrasound.

The coating solution contains the compounds aluminium oxide C and positively charged silicium dioxide in a weight ratio of 80:20.

d) Coating

1 $m^2$ of the coated support contains 6.5 g of inorganic compounds and 1.75 g of polyvinyl alcohol.

Comparative Example 21 C1
c) Preparation of the Coating Solution 54.17 g of the aqueous dispersion of $Al_2O_3$ of example 1a) and 11.16 g of water were mixed at a temperature of 20° C. Afterwards the solution was heated to a temperature of 40°

C., 22.84 g of a solution of polyvinyl alcohol (7.5%) were added, the total weight was adjusted to 100 g with deionised water and the solution was homogenized by exposure to ultrasound.

d) Coating 1 m² of the coated support contains 6.5 g of aluminium oxide C and 1.75 g of polyvinyl alcohol.

Example 22 c) Preparation of the Coating Solution 4.86 g of an aqueous dispersion of Snowtex® Up (20.3%, available from Nissan Chemical Industries Ltd., Tokyo, Japan) were mixed at a temperature of 20° C. with 18.05 g of ICH 286, 1.2 g of acetic acid and 11.16 g of deionised water under stirring. Afterwards the solution was heated to a temperature of 40° C., 23.4 g of a solution of polyvinyl alcohol (7.5%) were added, the total weight was adjusted to 100 g with deionised water and the solution was homogenized by exposure to ultrasound. The coating solution contains the compounds ICH 286 and Snowtex® Up (negatively charged silicium dioxide) in a weight ratio of 95:5.

d) Coating 1 m² Of the coated support contains 19.5 g of inorganic compounds and 1.71 g of polyvinyl alcohol.

Comparative Example 22 C1 c) Preparation of the Coating Solution 1 g of ICH 286 and 40 g of water were mixed at a temperature of 20° C. under stirring. Afterwards the mixture was heated to a temperature of 40° C., 22.84 g of a solution of polyvinyl alcohol (7.5%) were added, the total weight was adjusted to 100 g with deionised water and the solution was homogenized by exposure to ultrasound.

d) Coating 1 m² of the coated support contains 19.5 g of ICH 286 and 1.75 g of polyvinyl alcohol.

Comparative Example 22 C2 c) Preparation of the Coating Solution 49.26 g of the aqueous dispersion of Snowtex® Up were mixed under stirring at a temperature of 20° C. with 1.2 g of acetic acid and 20 g of deionised water. Afterwards the solution was heated to a temperature of 40° C., 22.84 g of a solution of polyvinyl alcohol (7.5%) were added, the total weight was adjusted to 100 g with deionised water and the solution was homogenized by exposure to ultrasound.

d) Coating 1 m² of the coated support contains 19.5 g of Snowtex® and 1.71 g of polyvinyl alcohol.

Example 23 c) Preparation of the Coating Solution U 54.17 g of the aqueous dispersion of positively charged SiO₂ of example 8a) were mixed at a temperature of 40° C. with 33.8 g of a solution of polyvinyl alcohol (7.5%). The total weight was adjusted to 100 g with deionised water and the solution was homogenized by exposure to ultrasound.

d) Coating 100 g /m² of this coating solution U were coated in the usual way unto a transparent polyester support. Onto this layer were coated 100 g/m² of the coating solution of example 8c).

1 m² of the lower coated layer contains 6.5 g of positively charged silicium dioxide and 2.53 g of polyvinyl alcohol.

1 m² of the upper coated layer contains 17.3 g of inorganic compounds and 1.56 g of polyvinyl alcohol.

Homogeneity and Dye Bleeding Results

Examples 1–5

The results for image homogeneity and dye bleeding for mixtures of aluminium oxide C and ICH 286 (Compound of example 1a) of EP 0,967,086) are listed in Table 4.

TABLE 4

| Example No. | System | Image Homogeneity | Dye bleeding |
|---|---|---|---|
| 1 | 70% aluminum oxide C 30% ICH 286 | 8 | 4 |
| 2 | 60% aluminum oxide C 40% ICH 286 | 8 | 5 |
| 3 | 50% aluminum oxide C 50% ICH 286 | 7 | 5 |
| 4 | 40% aluminum oxide C 60% ICH 286 | 0 | 5 |
| 5 | 30% aluminum oxide C 70% ICH 286 | 7 | 5 |
| 1 C1 | 100% aluminum oxide C | 4 | 5 |
| 1 C2 | 100% ICH 286 | 9 | 5 |

The results in Table 4 immediately show that the optimum mixture of aluminium oxide C and ICH 286 (Example 4) has a much better image homogeneity than the comparative examples 1 C1 and 1 C2 each containing only one of both components.

The layers of examples 1 to 5 are considerably more transparent than the layer of comparative example 1 C1.

Example 6

The results for image homogeneity and dye bleeding for mixtures of aluminium oxide C and Disperal® 100/2 are listed in Table 5.

TABLE 5

| Example No. | System | Image Homogeneity | Dye bleeding |
|---|---|---|---|
| 6 | 30% Aluminum oxide C 70% Disperal ® 100/2 | 11 | 4 |
| 6 C1 | 100% Disperal ® 100/2 | 17 | 4 |
| 6 C2 | 100% Aluminum oxide C | 14 | 2 |

The results in Table 5 immediately show that the mixture of aluminium oxide C and Disperal® 100/2 (Example 6) has a much better image homogeneity than the comparative examples 6 C1 and 6 C2 each containing only one of both components. In particular, image homogeneity and dye bleeding are much better with the mixture of aluminium oxide C and Disperal® 100/2 (example 6) than with aluminium oxide C as the sole component (comparative example 6 C2).

The layer of example 6 is considerably more transparent than the layer of comparative example 6 C2.

Example 7

The results for image homogeneity and dye bleeding for mixtures of Disperal® 100/2 and Dispal® 100/2 are listed in Table 6.

TABLE 6

| Example No. | System | Image Homogeneity | Dye bleeding |
|---|---|---|---|
| 7 | 64% Disperal ® 100/2 36% Dispal ® 14R25 | 12 | 4 |
| 7 C1 | 100% Disperal ® 100/2 | 24 | 2 |
| 7 C2 | 100% Dispal ® 14R25 | 50 | 1 |

The results in Table 6 immediately show that the mixture of Dispal® 14R25 and Disperal® 100/2 (Example 7) has a much better image homogeneity and considerably less dye bleeding than the comparative examples 7 C1 and 7 C2 each containing only one of both components.

Examples 8–12

The results for image homogeneity and dye bleeding for mixtures of aluminium oxide C, ICH 286 (Compound of example 1a) of EP 0,967,086), Dispal® 100/2 and positively charged SiO2 are listed in Table 7.

TABLE 7

| Example No. | System | Image Homogeneity | Dye bleeding |
|---|---|---|---|
| 8 | 70% ICH 286<br>10% aluminium oxide C<br>10% Dispal ® 14R25<br>10% SiO₂ (pos) | 4 | 5 |
| 9 | 80% ICH 286<br>20% SiO₂ (pos) | 5 | 5 |
| 10 | 90% ICH 286<br>10% SiO₂ (pos) | 5 | 5 |
| 11 | 80% ICH 286<br>10% aluminium oxide C<br>10% SiO₂ (pos) | 5 | 5 |
| 12 | 80% ICH 286<br>10% Dispal ® 14R25<br>10% SiO₂ (pos) | 5 | 5 |
| 8 C1 | 100% ICH 286 | 9 | 5 |

The results in Table 7 immediately show that all tested mixtures of ICH 286, aluminium oxide C, Dispal® 14R25 and SiO₂ (pos) (examples 8–12) have a better image homogeneity than the comparative example 8 C1 containing only ICH 286.

Example 13

The results for image homogeneity and dye bleeding for the mixture of ICH 286 (Compound of example 1a) of EP 0,967,086) and imogolite are listed in Table 8.

TABLE 8

| Example No. | System | Image Homogeneity | Dye bleeding |
|---|---|---|---|
| 13 | 97.7% ICH 286<br>2.3% imogolite | 6 | 5 |
| 1 C1 | 100% ICH 286 | 9 | 5 |

The results in Table 8 immediately show that the mixture of ICH 286 (Compound of example 1a) of EP 0,967,086) and imogolite (example 13) has a better image homogeneity than the comparative example 1 C1 containing only ICH 286.

Example 14

The results for image homogeneity and dye bleeding for the mixture of aluminium oxide C and imogolite are listed in Table 9.

TABLE 9

| Example No. | System | Image Homogeneity | Dye bleeding |
|---|---|---|---|
| 14 | 97.7% aluminium oxide C<br>2.3% imogolite | 2 | 5 |
| 14 C1 | 100% aluminium oxide C | 4 | 5 |

The results in Table 9 immediately show that the mixture of aluminium oxide C and imogolite (example 14) has a better image homogeneity than the comparative example 14 C1 containing only aluminium oxide C.

The layer of example 14 is considerably more transparent than the layer of comparative example 14 C1 and shows a considerably reduced tendency to form cracks.

Example 15

The results for image homogeneity and dye bleeding for the mixture of ICH 277 (compound of example 1a) of EP 0,875,394) and aluminium oxide C are listed in Table 10.

TABLE 10

| Example No. | System | Image Homogeneity | Dye bleeding |
|---|---|---|---|
| 15 | 20% aluminium oxide C<br>80% ICH 277 | 5 | 5 |
| 15 | 100% ICH 277 | 8 | 5 |

The results in Table 10 immediately show that the mixture of aluminium oxide C and ICH 277 (compound of example 1a) of EP 0,875,394) (example 15) has a better image homogeneity than the comparative example 15 containing only ICH 277.

Example 16

The results for image homogeneity and dye bleeding for the mixture of positively charged silicium dioxide SiO₂ (pos) and imogolite are listed in Table 11.

TABLE 11

| Example No. | System | Image Homogeneity | Dye bleeding |
|---|---|---|---|
| 16 | 96% SiO₂ (pos)<br>4% imogolite | 5 | 5 |
| 16 C1 | 100% SiO₂ (pos) | 12 | 5 |

The results in Table 11 immediately show that the mixture of positively charged silicium dioxide SiO₂ (pos) and imogolite (example 16) has a better image homogeneity than the comparative example 16 C1 containing only positively charged silicium dioxide.

The layer of example 16 is considerably more transparent than the layer of comparative example 16 C1 and shows a much-reduced tendency to form cracks.

Example 17

The results for image homogeneity and dye bleeding for the mixture of aluminium oxide C and Dispal® 14R25 are listed in Table 12.

TABLE 12

| Example No. | System | Image Homogeneity | Dye bleeding |
|---|---|---|---|
| 17 | 20% aluminium oxide C 80% Dispal® 14R25 | 12 | 2 |
| 17 C1 | 100% Dispal® 14R25 | 35 | 1 |

The results in Table 12 immediately show that the mixture of aluminium oxide C and Dispal® 14R25 (example 17) has a better image homogeneity and less dye bleeding than the comparative example 17 C1 containing only Dispal® 14R25.

Example 18

The results for image homogeneity and dye bleeding for the mixture of positively charged silicium dioxide and Dispal® 14R25 are listed in Table 13.

TABLE 13

| Example No. | System | Image Homogeneity | Dye bleeding |
|---|---|---|---|
| 18 | 10% SiO₂ (pos) 90% Dispal® 14R25 | 10 | 4 |
| 18 C1 | 100% Dispal® 14R25 | 27 | 2 |

The results in Table 13 immediately show that the mixture of positively charged silicium dioxide SiO$_2$ (pos) and Dispal® 14R25 (example 18) has a better image homogeneity and less dye bleeding than the comparative example 18 C1 containing only Dispal® 14R25.

The layer of example 18 is considerably more transparent than the layer of comparative example 18 C1 and shows a much reduced tendency to form cracks.

Example 19

The results for image homogeneity and dye bleeding for the mixture of positively charged silicium dioxide and Dispal® 14R25 are listed in Table 14.

TABLE 14

| Example No. | System | Image Homogeneity | Dye bleeding |
|---|---|---|---|
| 19 | 90% SiO₂ (pos) 10% Dispal® 14R25 | 9 | 5 |
| 19 C1 | 100% SiO₂ (pos) | 1 | 5 |

The layer of example 19 is much more transparent than the layer of comparative example 19 C1 which has a lot of micro cracks and is therefore nearly non-transparent.

The results in Table 14 show that the mixture of positively charged silicium dioxide SiO$_2$ (pos) and Dispal® 14R25 (example 19) has a worse image homogeneity than the comparative example 19 C1 containing only SiO$_2$ (pos). The reason is the existence of many micro cracks wherein inks are well absorbed. Such a material, however, is not usable as a transparency.

Example 20

The results for image homogeneity and dye bleeding for the mixture of positively charged silicium dioxide and aluminium oxide C are listed in Table 15.

TABLE 15

| Example No. | System | Image Homogeneity | Dye bleeding |
|---|---|---|---|
| 20 | 80% SiO₂ (pos) 20% aluminium oxide C | 8 | 5 |
| 20 C1 | 100% SiO₂ (pos) | 13 | 3 |

The results in Table 15 immediately show that the mixture of SiO$_2$ (pos) and aluminium oxide C (example 20) has a better image homogeneity and less dye bleeding than the comparative example 20 C1 containing only SiO$_2$ (pos).

The layer of example 20 is considerably more transparent than the layer of comparative example 20 C1.

Example 21

The results for image homogeneity and dye bleeding for the mixture of positively charged silicium dioxide and aluminium oxide C are listed in Table 16.

TABLE 16

| Example No. | System | Image Homogeneity | Dye bleeding |
|---|---|---|---|
| 21 | 20% SiO₂ (pos) 80% aluminium oxide C | 3 | 5 |
| 21 C1 | 100% aluminium oxide C | 5 | 5 |

The results in Table 16 immediately show that the mixture of SiO$_2$ (pos) and aluminium oxide C (example 21) has a better image homogeneity and less dye bleeding than the comparative example 21 C1 containing only aluminium oxide C.

Example 22

The results for image homogeneity and dye bleeding for the mixture of positively charged silicium dioxide Snowtex® Up and ICH 286 (compound of example 1a) of EP 0,967,086) are listed in Table 17.

TABLE 17

| Example No. | System | Image Homogeneity | Dye bleeding |
|---|---|---|---|
| 22 | 5% Snowtex® Up 95% ICH 286 | 7 | 5 |
| 22 C1 | 100% ICH 286 | 11 | 3 |
| 22 C2 | 100% Snowtex® Up | 30 | 1 |

The results in Table 17 immediately show that the mixture of negatively charged silicium dioxide Snowtex® Up and ICH 286 (compound of example 1a) of EP 0,967,086) (example 22) has a better image homogeneity and considerably less dye bleeding than the comparative examples 22 C1 and 22 C2 each containing only one of the components of the mixture.

Example 23

The double layer system did not show any cloudiness at the boundary interface not depending on whether the two coating solutions were coated one after the other or together onto the support. After printing, image quality was the same as for a reference coating with a twice-coated lower layer. The double layer system was however considerably more transparent than the system with the twice-coated lower layer.

Finally, variations from the examples given herein are possible in view of the above disclosure. Therefore, although the invention has been described with reference to certain preferred embodiments, it will be appreciated that other dyes may be devised, which are nevertheless with the scope and spirit of the invention as defined in the claims appended hereto.

The foregoing description of various and preferred embodiments of the present invention has been provided for purposes of illustration only, and it is understood that numerous modifications, variations and alterations may be made without departing from the scope and spirit of the invention as set forth in the following claims.

What is claimed is:

1. A recording sheet for ink jet printing comprising a support having coated onto said support at least one ink receiving layer comprising one or more binders and a mixture of different water insoluble, (i) inorganic oxides of the elements aluminium or silicium, (ii) oxide/hydroxides of the element aluminium or (iii) aluminium silicates, wherein at least one of said oxides, oxides/hydroxides or silicates has a pore volume of $\geq 40$ ml/100 g and is present in an amount of at least 8 weight percent relative to the total amount of all the water insoluble, inorganic oxides, oxide/hydroxides or silicates; wherein the mixture contains primary particles; and wherein the primary particles of the mixture component with the largest volume have an equivalent sphere diameter of less than 20 nm; and the primary particles of the mixture component with the smallest volume have an equivalent sphere diameter that is at least 1/20 of the equivalent sphere diameter of the primary particles of the mixture component with the largest volume and wherein one of the components of the mixture has a first morphology and another component of the mixture has a second morphology, different from the first morphology.

2. A recording sheet according to claim 1 wherein at least one of said oxides, oxides/hydroxides or silicates with a pore volume of $\geq 40$ ml/100 g is present in an amount of at least 40 weight percent relative to the total amount of all the water insoluble, inorganic oxides, oxide/hydroxides or silicates.

3. A recording sheet according to claim 1 wherein the primary particles of the mixture component with the largest volume have an equivalent sphere diameter of less than 15 nm and the primary particles of the mixture component with the smallest volume have an equivalent sphere diameter that is at least 1/10 of the equivalent sphere diameter of the primary particles of the mixture component with the largest volume.

4. A recording sheet according to claim 1 wherein one of the components of the mixture is of spherical shape and another one is of platelet shape.

5. A recording sheet according to claim 1 wherein one of the components of the mixture is of spherical shape and another one is of rod shape.

6. A recording sheet according to claim 1 wherein one of the components of the mixture is of spherical shape and another one is of fiber shape.

7. A recording sheet according to claim 1 wherein one of the components of the mixture is of platelet shape and another one is of fiber shape.

8. A recording sheet according to claim 1 wherein one of the components of the mixture is aluminium oxide/hydroxide and another one is γ- or δ-aluminium oxide.

9. A recording sheet according to claim 1 wherein one of the components of the mixture is aluminium oxide/hydroxide and another one is silicium dioxide.

10. A recording sheet according to claim 1 wherein one of the components of the mixture is γ- or δ-aluminium oxide and another one is silicium dioxide.

11. A recording sheet according to claim 9 wherein the silicium dioxide is positively charged.

12. A recording sheet according to claim 10 wherein the silicium dioxide is positively charged.

13. A recording sheet according to claim 1 wherein one of the components of the mixture is γ- or δ-aluminium oxide and another one is imogolite.

14. A recording sheet according to claim 1 wherein one of the components of the mixture is positively charged silicium dioxide and another one is imogolite.

15. A recording sheet according to claim 1 wherein one of the components of the mixture is aluminium oxide/hydroxide and another one is imogolite.

16. A recording sheet according to claim 15 wherein the aluminium oxide/hydroxide contains one or more of the elements with atomic number 57 to 71 in a total amount of 0.04 to 4.2 mole percent relative to $Al_2O_3$.

17. A recording sheet according to claim 1 wherein the binder or binders are gelatin, polyvinyl alcohol, derivates of polyvinyl alcohol, polyvinyl pyrrolidone or mixtures thereof.

18. Pigment containing coating compositions for the preparation of ink receiving layers for recording sheets for ink jet printing according to claim 1.

19. A recording sheet according to claim 8 wherein the aluminium oxide/hydroxide contains one or more of the elements with atomic number 57 to 71 in a total amount of 0.04 to 4.2 mole percent relative to $Al_2O_3$.

20. A recording sheet according to claim 9 wherein the aluminium oxide/hydroxide contains one or more of the elements with atomic number 57 to 71 in a total amount of 0.04 to 4.2 mole percent relative to $Al_2O_3$.

21. A recording sheet according to claim 11 wherein the aluminium oxide/hydroxide contains one or more of the elements with atomic number 57 to 71 in a total amount of 0.04 to 4.2 mole percent relative to $Al_2O_3$.

* * * * *

UNITED STATES PATENT AND TRADEMARK OFFICE
CERTIFICATE OF CORRECTION

PATENT NO. : 6,780,478 B2
DATED : September 29, 2004
INVENTOR(S) : Steiger et al.

It is certified that error appears in the above-identified patent and that said Letters Patent is hereby corrected as shown below:

Column 2,
Line 19, delete "$Al_2O_3.n$" and insert -- $Al_2O_3 \cdot n$ --.

Column 6,
Line 28, delete "hexahy-dro-s-triazine" and insert -- hexahydro-s-triazine --.

Column 7,
Line 2, delete "acetatelbutyrate" and insert -- acetate/butyrate --.
Line 51, delete "top-most" and insert -- topmost --.

Column 9,
Line 10, delete "$_2{}^{nd}$" and insert -- $2^{nd}$ --.

Column 12,
Lines 44-45, delete "$Al_2(OH)\ _5Cl.2.5\ H_2 0$" and insert -- $Al_2(OH)_5Cl \cdot 2.5\ H_2 0$ --.
Line 66, delete "Dispera®" and insert -- Disperal® --.

Column 14,
Line 52, delete "$Al_2(OH)_5Cl.2.5\ H_2 0$" and insert -- $Al_2(OH)_5Cl \cdot 2.5\ H_2 0$ --.

Signed and Sealed this

Twenty-eighth Day of December, 2004

JON W. DUDAS
*Director of the United States Patent and Trademark Office*